April 12, 1938.                E. D. LEHMAN                2,113,892
                         DIAPHRAGM DIALING APPARATUS
                          Filed Feb. 10, 1937          5 Sheets-Sheet 3
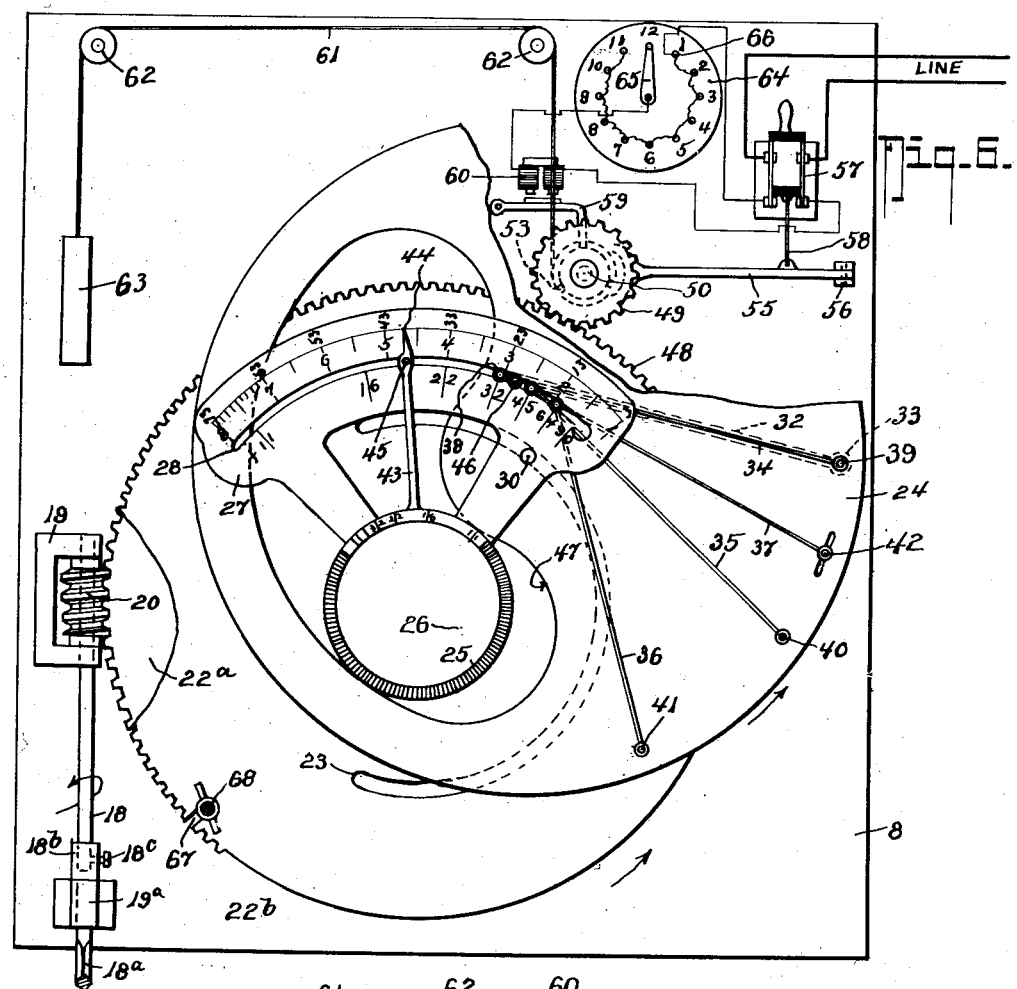
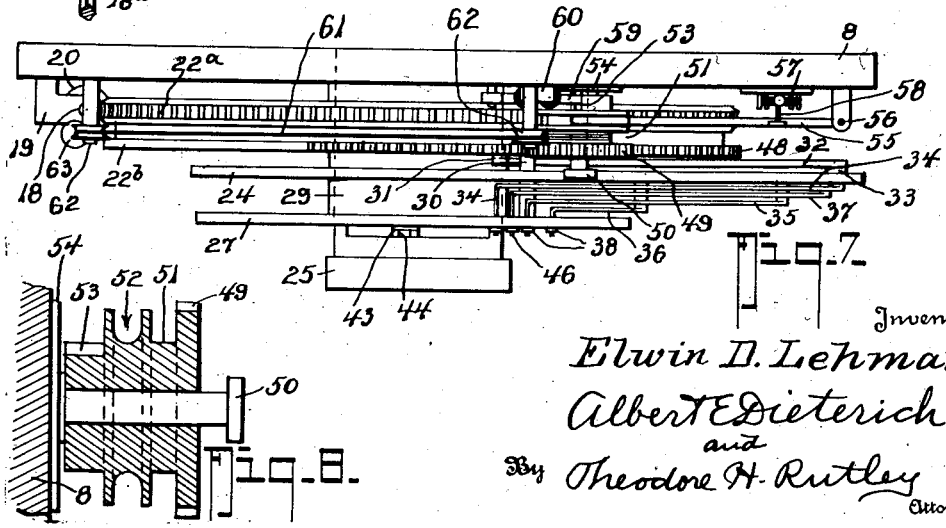
Inventor
Elwin D. Lehman
Albert E Dieterich
and
By Theodore H. Rutley
Attorneys.

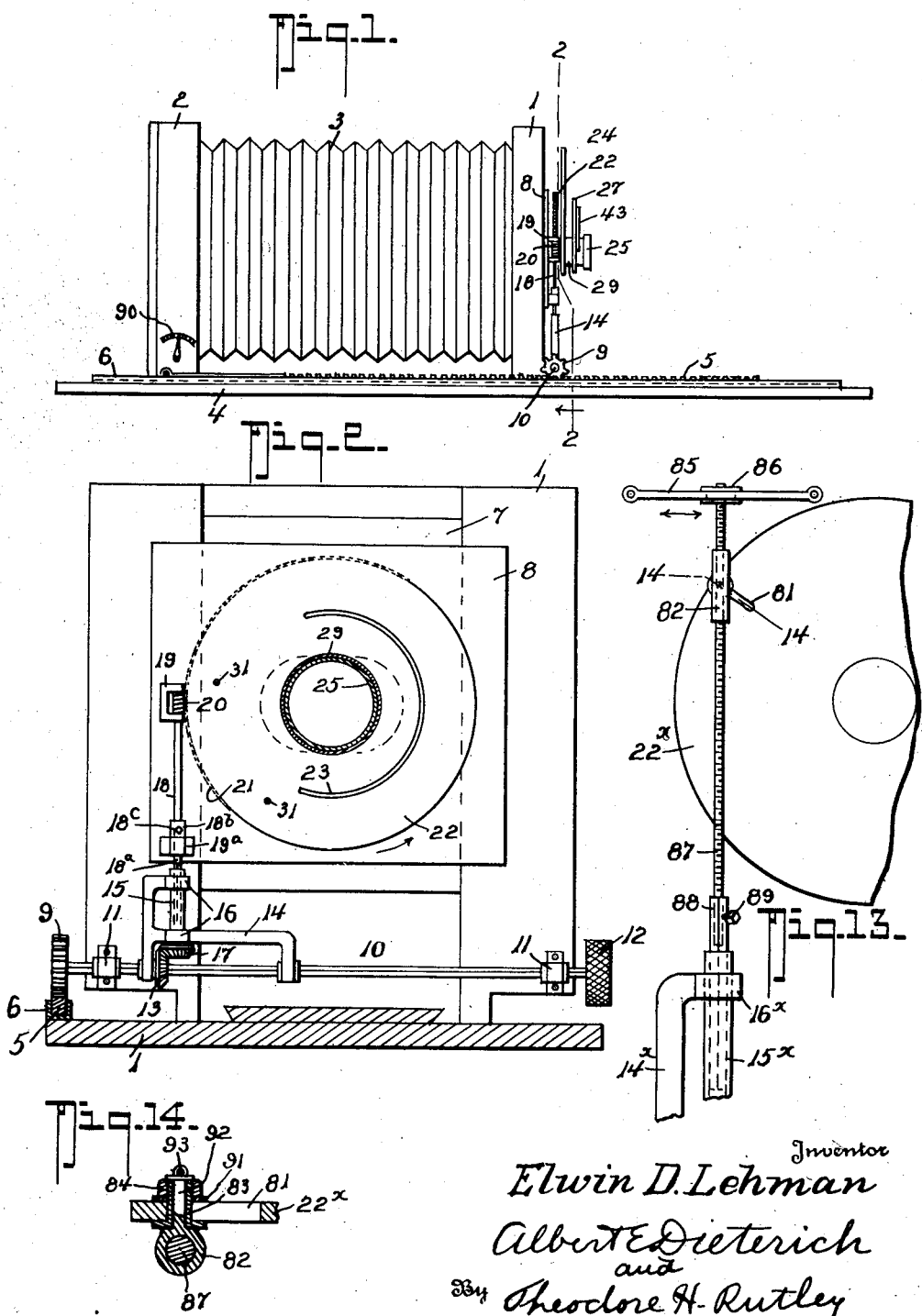

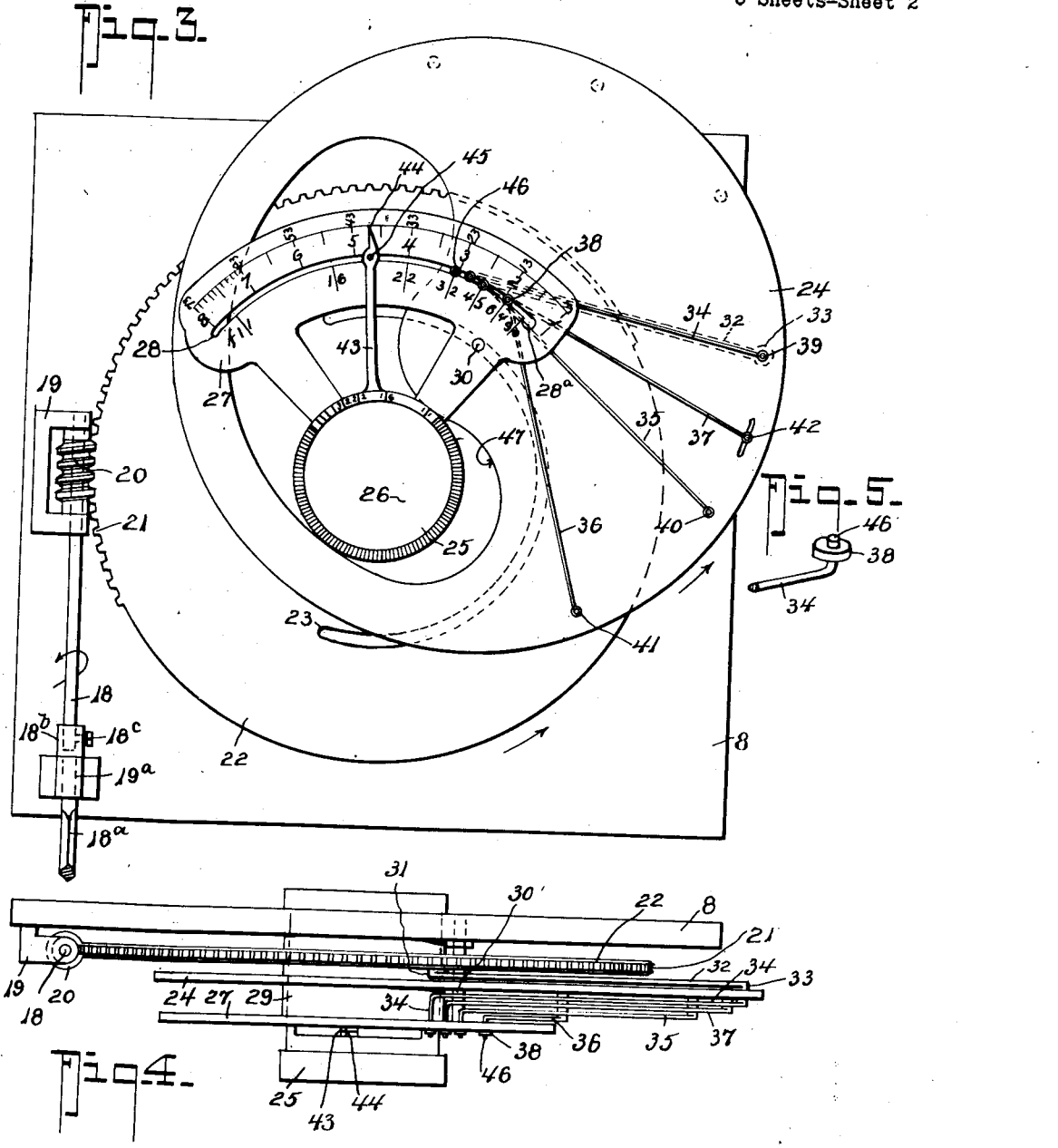

April 12, 1938. E. D. LEHMAN 2,113,892
DIAPHRAGM DIALING APPARATUS
Filed Feb. 10, 1937 5 Sheets-Sheet 4
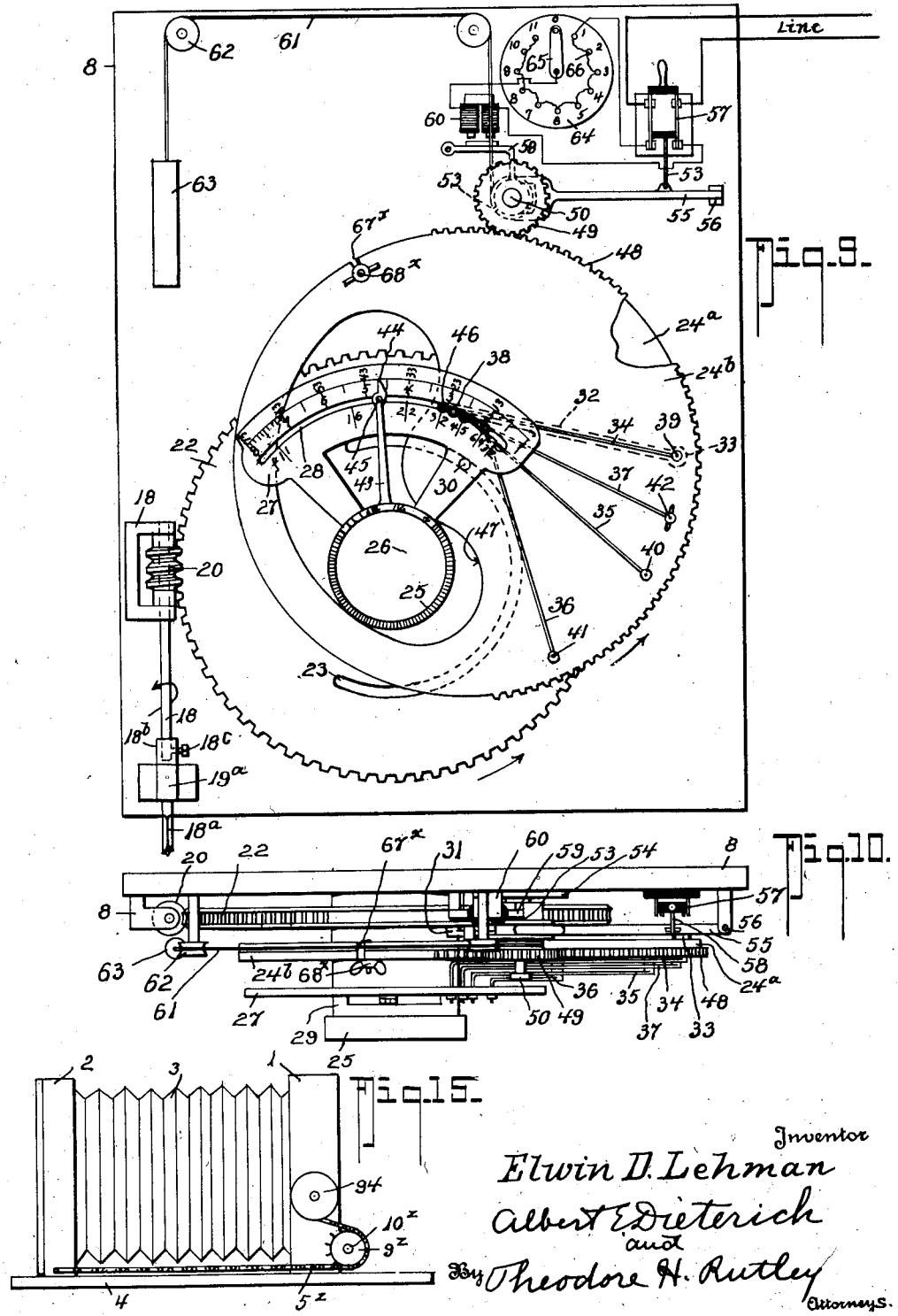
Inventor
Elwin D. Lehman
Albert E. Dieterich
and
By Theodore H. Rutley
Attorneys April 12, 1938.　　　　　E. D. LEHMAN　　　　　2,113,892
DIAPHRAGM DIALING APPARATUS
Filed Feb. 10, 1937　　　5 Sheets-Sheet 5

Inventor
Elwin D. Lehman
Albert E. Dieterich
and
Theodore H. Rutley
Attorneys.

Patented Apr. 12, 1938

2,113,892

UNITED STATES PATENT OFFICE 2,113,892

DIAPHRAGM DIALING APPARATUS

Elwin D. Lehman, Utica, N. Y.

Application February 10, 1937, Serial No. 125,137

17 Claims. (Cl. 95—64)

My invention relates to the art of photography, and it more particularly relates to the art as applied in line and halftone work.

Specifically, the invention relates to certain new and useful improvements in the cameras used in such work.

There are three known systems of regulating the size of the stop or diaphragm opening in line and halftone photography, i. e., assuming constant separation: the first is to make it proportional to the amount of enlargement or reduction of the copy to be photographed; the second is to make it proportional to the camera extension, i. e., to the distance from the ground glass to the nodal point of the lens (since the extension bears a proportional relation to the amount of enlargement or reduction, both methods figure out to the same thing and both can be charted to cover the range of the lens); and the third system is the guess system which, unfortunately, is employed by too many photographers. Measuring the extension is usually simpler and more practical than figuring the ratio of enlargement or reduction, and most so-called control systems use this method. These systems, however, are merely mechanical means of measuring the extension and charting the diaphragm opening; some use code or key numbers that correspond on the different parts of their device, thus facilitating the actual setting of the diaphragm, but all of them require reading a scale or dial and the actual setting must be performed by hand. My invention, therefore, has for its object to provide means which, while retaining any and all of the beneficial factors of the above systems, eliminates their disadvantages and makes it possible to dial the diaphragm automatically.

A further object of the present invention is to provide a camera with a timing arrangement and an automatic multiple exposure diaphragm adjustment.

Further, it is an object of the invention to provide not only a diaphragm dialing means, but a means properly to set the lens for line, halftone and continuous tone negatives, and also to make single or multiple exposures.

Again, it is an object to provide means whereby the camera may be used to do both photo-engraving and photo-lithographic work, and all types of reproduction work, using the automatic diaphragm dialing.

Another object is, in a modified form of the invention, to provide a hand drive, or finger-tip diaphragm dialer, that can be used where the automatic dialer is not desired.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 1 is a side elevation of a camera with my invention applied (parts being omitted for clearness).

Figure 2 is an enlarged section on the line 2—2 of Figure 1.

Figure 3 is an enlarged front elevation of the lens board which carries my invention.

Figure 4 is a top plan view of the same.

Figure 5 is a detail perspective view of one of the buttons carried by a push rod.

Figure 6 is a front elevation of another embodiment of the invention hereinafter described, parts being broken away.

Figure 7 is a top plan view of the embodiment shown in Figure 6.

Figure 8 is a detail section showing how the power driven ratchet-gear element is mounted.

Figure 9 is a view similar to Figure 6 of another embodiment of the invention.

Figure 10 is a top plan view of the embodiment of the invention shown in Figure 9.

Figure 13 is a detail view in elevation, showing a modified disc drive.

Figure 14 is a detail section, enlarged, on the line 14—14 of Figure 13.

Figure 15 is a side elevation showing a modified means for turning the drive axle.

In the drawings like parts are indicated in all figures by the same reference number.

Figure 11:
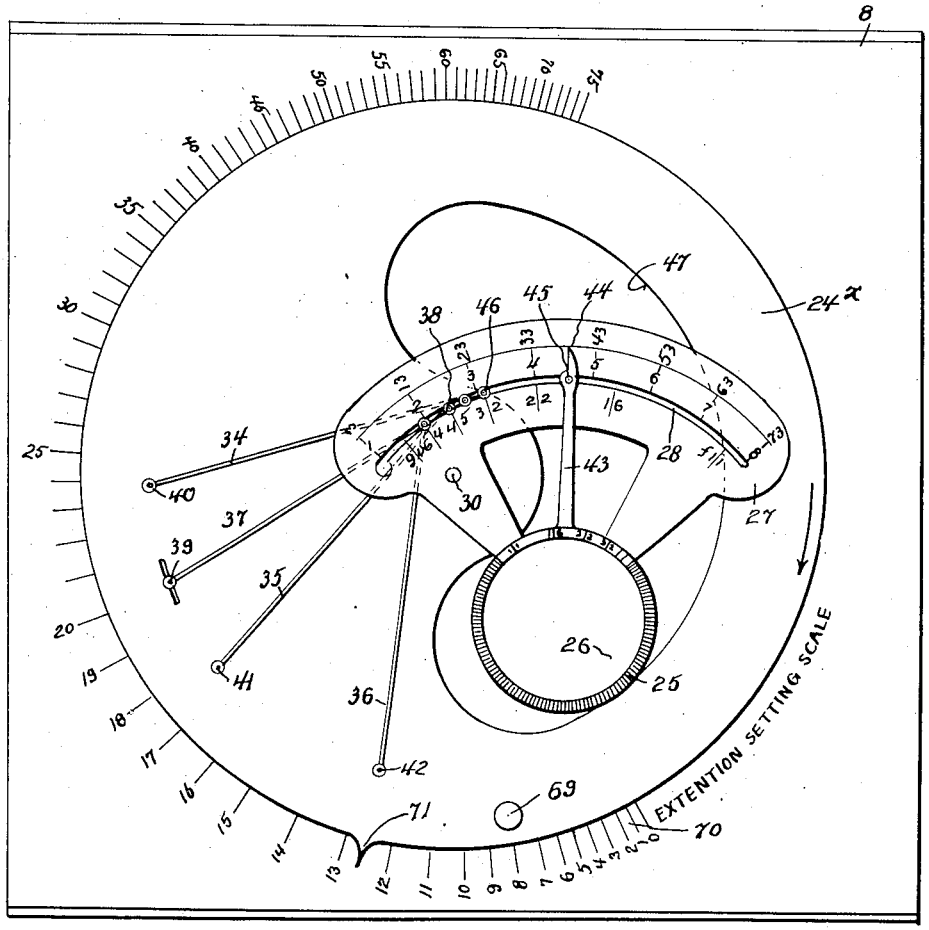
Figure 11 is a front elevation of a modification of the invention adapted for hand dialing.

Referring now more particularly to the first embodiment of the invention, Figures 1 to 5, inclusive, it will be seen that 1 designates the front of the camera, 2 the back, 3 the bellows, 4 the base or support, 90 a known screen separation indicator, and 25 the usual lens holder, all of which are of known construction.

The lens board 8 is laterally adjustably mounted on the vertically adjustable board 7, while the board 7 is vertically adjustably mounted on the front of the camera. A gear track 5 is secured to the back 2 and lies in a slideway 6 that is mounted on the base 4.

On the front of the camera is mounted, in bearings 11, a square shaft 10 carrying a pinion 9 which meshes with the track 5 and is turned by a finger wheel 12.

Slidably mounted on the shaft 10 is a bearing support 14 and a bevel gear 13 which meshes with a bevel gear 17 on a sleeve 15 that is journaled in bearings 16 and has a square recess for the reception of the squared end 18ª of a short shaft journaled in a bearing 19ª and having a socketed collar 18ᵇ to receive, adjustably, the worm shaft 18, the latter being held in place by a set screw 18ᶜ. The worm shaft 18 is also journaled in a bearing 19 mounted, as is the bearing 19ª, on the lens board 8.

The worm 20 meshes with the worm-gear 21 on the periphery of the rotatable disc 22 which is mounted to turn on the lens holder 25, in which the lens 26 is carried in the usual way.

The disc 22 has a slot 23 through which passes the post 30 that is mounted on the lens board 8 and serves as a means to hold the calibration plate 27 immovable. The post 30 also serves as the pivotal axis for the dialing disc 24. The dialing disc 24 has a slot 47 for passing the lens holder 25.

The calibration plate has a sleeve 29 to embrace the lens holder 25 and cooperate with the post 30 in holding the plate rigid. The plate 27 has a slot track 28 having an enlarged entrance 28ª at one end for the passage of the buttons 38 which are carried by the push rods 34, 35, 36 and 37. These push rods are pivoted, respectively at 39, 40, 41 and 42 to the dialing disc 24, the pivots 39, 40 and 41 being equally spaced apart, and the pivot 42 being spaced midway between the pivots 39 and 40. All pivots 39 to 42, inclusive, are spaced the same distance from the axis at 30.

The rods 34 to 37, inclusive, are all of the same length and when the parts are positioned as shown in Figure 3, the buttons are positioned as follows:—the button of rod 34 lies at calibration "32" on the lower or shutter opening or "stops" scale on calibration plate 27; the button of rod 35 lies at the "45" mark; the button of rod 36 lies at the "64" mark; and the button of rod 37 lies halfway between marks "32" and "45", the reason for which will later appear.

One connecting rod 32, of a length equal to that of the push rods, is pivoted at 31 to disc 22 and at 33 to disc 24. The pivot 31 lies just beneath high light button 46 of rod 34, while pivot 33 coincides with pivot 39.

The pivot 42 is mounted for some adjustment along a slot in disc 24 for a purpose also later understood.

The arm 43, which operates the usual iris diaphragm (not shown), has a pointer end to cooperate with the scale on calibration plate 27 which lies next above the slot track 28, such scale being calibrated in equi-spaced divisions indicating camera extensions. The scale below the slot track 28 is calibrated in divisions corresponding to the usual lens stops (ƒ11, 16, 22, 32, 45, 64, 90). If desired, a third set of numbers may be used for the extension scale to give the reading in inches (see 3, 13, 23, 43, 53, 63, 73, at top of plate 27).

The arm 43 has a hole to fit over the pins 46 on the buttons 38 so as to connect the arm to the desired button. (The arm is shown disconnected from the buttons in the drawings for convenience of illustration.)

*Operation of the embodiment of the invention shown in Figures 1 to 5 inclusive*

The gearing between track 5 and disc 22 is such that for every inch of camera extension disc 22 will be turned in like amounts, the movements of the disc being in equal degrees; the eccentricity of the disc 24, the connection of rod 32, and the locations of the pivots 39—42, inclusive, are such that every ten inches of camera extension moves the highlight button one upper space on the calibration plate, so these are all spaced ten extension points apart. At the same time the other buttons will deploy to their proper place so that each of the three buttons is one diaphragm space apart—which is always the way I shoot a halftone—because each one of these spaces admits just twice the amount of light as the preceding one, and this arrangement keeps tones of the negative in balance. The button of rod 37 for the single stop will also take its proper place for a single stop exposure.

Assuming that it is desired to use the camera in photography where we have a balanced exposure, splendid results may be obtained in making halftones by a one-stop exposure system for all normal copy. Button 38 on rod 37 and pivot 42 are properly positioned for this single stop system. A slight adjustment of pivot 42 is arranged for so as to permit making slightly "higher" or "lower" negatives, as shop practice varies in this respect.

The arm 43 (being springy) is now snapped over pin 46 of the button of rod 37 and knob 12 is turned (or other usual mechanism is operated) to get the desired camera extension, thereby automatically moving the diaphragm dialing arm to the proper position.

It should be understood that each rod 34, 35, 36, has a button 38 and a pin 46.

For photo-engraving negatives the exposure must be unbalanced to allow for the effect of etching on dot formation, so a single stop exposure will not suffice. For this work I use the three thrust rods 34, 35 and 36, and their three buttons. When using the three thrust rods, the indicator hand 43 can only be automatically controlled by one, so it will be necessary to move the indicator from the button of rod 34 to that of rod 35 and then to that of rod 36 in making the exposure. However, these buttons are all in proper position, that of rod 34 for high light, that of rod 35 for middle tone, and that of rod 36 for detail exposure, so no setting is required from any auxiliary chart; all that is necessary is to snap indicator 43 onto the three buttons successively.

In making line work, most operators are heavily inclined toward the guess system. However, with my control this is unnecessary as the button of rod 36 will always be in position to shoot line work without any alteration in exposure time. Halftone time is likewise constant with this system, so it really approaches a new high in simplicity.

*Embodiment of the invention shown in Figures 6 to 8 inclusive*

This embodiment of the invention includes a timing arrangement and provides an automatic multiple exposure, using one thrust rod with the indicator snapped into position (the highlight position). Instead of using one driven disc, I employ two discs, the discs being numbered 22ª and 22ᵇ, respectively. The driving disc 22ª has the worm gear, while the intermediate disc 22ᵇ has a spur gear periphery 48. The discs 22ª and 22ᵇ are normally locked together to turn in unison by a latch bolt 68 in slots 67.

The rod 32 is connected to disc 22ᵇ. All parts in front of disc 22ᵇ are the same in construction and operation as in the first embodiment of the invention, so a further description thereof here is thought to be unnecessary.

Mounted on a stud 50, carried by a plate 54 secured to the lens board 8, is a drum-like body comprising a gear element 49, a cable drum element 51, a shifter fork groove 52 and a ratchet element 53. A forked lever 55 is pivoted at 56 to the lens board 8 and has its fork held in groove 52.

A knife switch 57 is mounted on lens board 8 and is connected with lever 55 by a connecting rod 58, the arrangement being such that upon opening the switch the gear 49 will be unmeshed from gear 48, and when the switch is closed the gear 49 will be in mesh with gear 48.

A pawl 59 is pivoted to the lens board 8 and normally engages the ratchet 53 by gravity. It is released by a magnet 60 controlled by a time switch 64 having a movable contact 65 and a series of fixed contacts 66. The magnet 60 is electrically connected to one blade of switch 57, while the other blade is connected with the fixed contacts 66, the movable contact 65 being connected to the magnet 60 (see Figure 6). The power or line wires connect to the contacts of the switch with which the knives engage and disengage. This magnet is energized momentarily as the movable contact engages successive fixed contacts on the time switch 64 for the intervals to which the same has been set. A suitable motor turns the drum-like member 49—53. Such a motor may be a weight 63 and cable 61 passed over pulleys 62 and wound on the drum 51.

*Operation of the embodiment of the invention shown in Figures 6 to 8 inclusive*

Instead of using one disc 22, as in the first described embodiment of the invention, the two discs 22ᵃ and 22ᵇ are used clamped together; the drive power of the camera actuating the back disc 22ᵃ drives the other 22ᵇ through the clamp connection 67—68 in unison, getting one indicator position—the highlight position—in the same manner as with the one thrust arm in the first embodiment. Then the two plates 22ᵃ and 22ᵇ are unclamped so as not to disturb the mesh and position of the camera drive gears. Then the power switch 57 is closed, thereby bringing gear 49 into mesh with gear face 48. When the circuit through magnet 60 is closed by the time switch 64 (which is but a few seconds at a time) the pawl 59 is lifted and the weight motor turns the gear 48 one step (the distance in degrees from one notch 53 to the next) at a time, thereby making a series of multiple time exposures until switch 57 is again opened and gear 49 unmeshed from gear 48.

Centering the intermediate disc 22ᵇ concentrically with the driving disc 22ᵃ, as shown in Figure 6, has the effect of giving multiple exposures with a series of stops governed in relation to the upper scale of the calibration plate.

In order to give multiple exposures governed in relation to the lower scale on the calibration plate, as would be necessary in shooting halftones, I center the intermediate disc concentrically with the dialing disc and clamp them together, as shown in Figures 9 and 10. In either arrangement only one button is utilized so the hand 43 is left attached to this button and the multiple exposures of either series of diaphragm openings is performed consecutively and automatically by the motive power of the timing apparatus.

*The embodiment of Figures 9 and 10*

The embodiment of Figures 9 and 10 differs from that shown in Figures 6 and 7, essentially, only in placing the third or intermediate disc (indicated here by 24ᵃ) in back of the dialing disc (indicated here by 24ᵇ) and coupling them together by the detachable coupling arrangement 67ˣ—68ˣ, the rod 32 being connected to the intermediate disc 24ᵃ. Also, the dialing disc has the teeth (48) with which the gear 49 meshes. All other parts bearing numbers the same as corresponding parts in Figures 6 and 7 may be of like construction to those of Figures 6 and 7.

Since the operation of the embodiment of Figures 9 and 10 is essentially the same as that of Figures 6 and 7 (save as above pointed out), further description thereof is thought to be unnecessary.

*The modification of Figure 11*

In this figure is shown a modified construction of device for dialing the diaphragm in accordance with camera extension, but not wholly automatically.

In this form the disc 24ˣ is of the same construction as the disc 24 of Figures 3 and 4 except that it is provided with a pointer 71 and a knob 69 and is not driven by mechanical means.

(In Figures 1 to 10 the apparatus is shown designed for use on a camera with a right-hand lens and left-hand drive, while in Figure 11 it is designed for a camera with a left-hand lens and right-hand drive, i. e., one is the mirror-reflection of the other.)

On the board 8 (or on a card rigidly attached thereto) is suitably marked a scale 70 indicating the necessary positions of the disc 24ˣ with regard to camera extensions, so that for any given camera extension it is only necessary to set the pointer 71 on the corresponding indicator mark of scale 70 to bring the buttons to their proper position. Arm 43 being snapped to its desired button, the diaphragm dialing will be complete.

Figure 12:
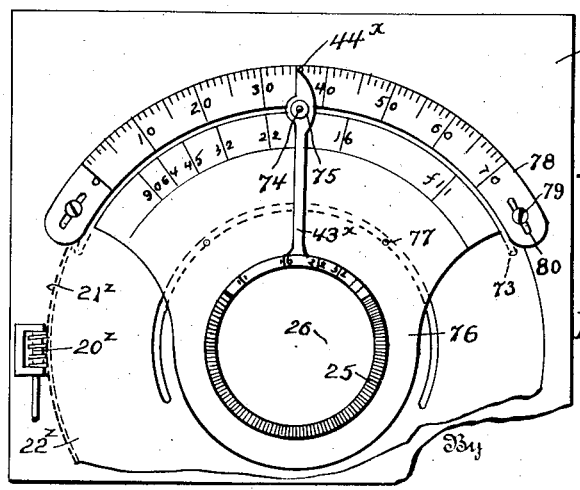
Figure 12 is a detail front elevation, showing another modification of the invention.

*The modification of Figure 12*

This figure discloses a hand-operated dialing device. The lens board 72 carries two scale charts 76 and 78. The scale 78 is preferably adjustably mounted on the lens holder 25, while the lower one, 76, is secured at 77 to the board 72. The upper scale is graduated in equally spaced divisions corresponding to the camera extensions, while the lower scale shows the stops.

To operate, measure the camera extension and set pointer 44ˣ of hand 43ˣ to proper number of inches on upper scale; then follow hand down to lower scale. The reading on lower scale will be the proper diaphragm stop for highlight exposure. The middletone stop will always be ten points, or one major space, to the left on the lower scale and the detail stop will be twenty points, or two major spaces, to the left on the lower scale.

The upper scale being movable for adjustment purposes, to make negatives higher pitched, move upper scale to right a couple of points; to make negatives lower pitched, move upper scale to left a couple of points.

Arm 43ˣ carries a knob 75 having a shank 74 that runs in a slot 73 as a guide.

By placing a driving disc 22ᶻ beneath the chart 76, operating it by camera extension, via worm 76

20ˣ and periphery 21ˣ (indicated by broken lines), and attaching shank 74 to disc 22ˣ, the diaphragm may be operated automatically by camera extension.

If desired to use the scales 76—78 simply as an indicator, the part 72 may consist of a base of cardboard, and arm 43ˣ may be rotatably mounted on the base 72, on the axis of which is the center of curvature of the slot 73 and scale markings.

*The modification of Figures 13 and 14*

In Figures 13 and 14 is shown a modified drive for the disc 22ˣ. In this construction the disc 22ˣ has a radial slot 81 in which is adjustably secured a sleeve 83, by a washer 91 and nut 84, the sleeve serving as a bearing for the stud 92 on the threaded sleeve 82 that is threaded on the rod 87. The rod 87 is carried in a slide bearing 86, mounted in a guide 85, and is threaded into the end of the square shaft section 88 for adjustment purposes, a set screw 89 serving to lock the parts together. The parts 14ˣ, 15ˣ and 16ˣ correspond to the parts 14, 15 and 16 in Figure 2.

This way of driving disc 22ˣ has several advantages: first, it avoids the necessity of putting gear teeth on the disc and leaves a smooth edge that will not catch on anything; secondly, it gives a method of varying the speed or, more properly, disc travel distance in relation to extension travel distance. This is advantageous as it makes it possible to use the same parts in constructing devices for slightly different calibrations. All that will be necessary is to make a new calibration plate and then reposition the disc centers so as to change the eccentricity to match.

Instead of the rack and pinion drive shown in Figure 1, a chain or perforated belt 5ᶻ, anchored to the back 2, passed around gear or toothed wheel 9ᶻ on drive axle 10ᶻ, and fastened to a spring take up 94 (see Figure 15), may be employed.

The drawings are illustrative of the principle of my invention. It will be understood, however, that changes in details, both of structure and calibration, will have to be made to adapt the invention to different makes of cameras, so I wish it understood that such changes may be made by those skilled in the art without departing from the spirit of the invention within the scope of the appended claims.

What I claim is:—

1. In a camera, a back and a front connected by a bellows, a lens board, a lens holder and an iris diaphragm and a diaphragm actuating arm carried by said board, a disc rotatably mounted concentrically with the lens holder, a gear-track extending lengthwise of the camera, a rotatable shaft carried by said board, power transmitting connections between said shaft and said disc and power transmitting connection between said gear-track and said shaft for turning said disc in proportion to camera extension, means operatively connecting said disc with the actuating arm of the diaphragm to dial the diaphragm to the proper stops for the different camera extensions, the last named means including an eccentric dialing disc, means connecting said dialing disc with said rotatable disc and a calibrating plate having an arcuate slot concentrically disposed to the axis of the lens holder, a push rod pivoted to said dialing disc and having a portion passing through said slot and carrying a button, and means to connect said actuating arm to said button.

2. In a camera, a back and a front connected by a bellows, a lens board, a lens holder and an iris diaphragm and a diaphragm actuating arm carried by said board, a disc rotatably mounted concentrically with the lens holder, a gear-track extending lengthwise of the camera, a rotatable shaft carried by said board, power transmitting connections between said shaft and said disc and power transmitting connection between said gear-track and said shaft for turning said disc in proportion to camera extension, means operatively connecting said disc with the actuating arm of the diaphragm to dial the diaphragm to the proper stops for the different camera extensions, the last named means comprising a second disc concentrically mounted to turn on the same axis as said first mentioned disc, releasable means connecting the first and second discs to turn in unison, an eccentrically mounted dialing disc, means connecting said dialing disc with said second disc, a calibrating plate having an arcuate slot concentrically disposed to the axis of the lens holder, at least one push rod pivoted to said dialing disc and having a portion passing through said slot and carrying a button, and means to connect said actuating arm to said button.

3. In a camera, a back and a front connected by a bellows, a lens board, a lens holder and an iris diaphragm and a diaphragm actuating arm carried by said board, a disc rotatably mounted concentrically with the lens holder, a gear-track extending lengthwise of the camera, a rotatable shaft carried by said board, power transmitting connections between said shaft and said disc and power transmitting connection between said gear-track and said shaft for turning said disc in proportion to camera extension, means operatively connecting said disc with the actuating arm of the diaphragm to dial the diaphragm to the proper stops for the different camera extensions, the last named means comprising a second disc concentrically mounted to turn on the same axis as said first mentioned disc, releasable means connecting the first and second discs to turn in unison, an eccentrically mounted dialing disc, means connecting said dialing disc with the second disc, a calibrating plate having an arcuate slot concentrically disposed to the axis of the lens holder, at least one push rod pivoted to said dialing disc and having a portion passing through said slot and carrying a button, means to connect said actuating arm to said button, and a time controlled mechanism, means connecting said time controlled mechanism with said second disc to actuate said second disc step-by-step, when said second disc shall have been disconnected from said first disc.

4. In a camera, a back and a front connected by a bellows, a lens board, a lens holder and an iris diaphragm and a diaphragm actuating arm carried by said board, a disc rotatably mounted concentrically with the lens holder, a gear-track extending lengthwise of the camera, a rotatable shaft carried by said board, power transmitting connections between said shaft and said disc and power transmitting connection between said gear-track and said shaft for turning said disc in proportion to camera extension, means operatively connecting said disc with the actuating arm of the diaphragm to dial the diaphragm to the proper stops for the different camera extensions, the last named means comprising a second disc concentrically mounted to turn on the same axis as said first mentioned disc, releasable means connecting the first and second discs to turn in unison, an eccentrically mounted dialing disc connected with the second disc, a calibrating plate having an arcuate slot concentrically disposed to the axis of the lens holder, at least one push rod pivoted to said dialing disc and having a portion passing through said slot and carrying a button, means to connect said actuating arm to said button, a time controlled mechanism, means connecting said time controlled mechanism with said second disc to actuate said second disc step-by-step, when said second disc shall have been disconnected from said first disc, and means to render said time controlled mechanism operative or non-operative at will.

5. In apparatus for the purposes described, the combination with a camera having a lens board, a lens holder with lens and iris diaphragm with a diaphragm setting arm mounted thereon, of a calibration plate carried by said board and having a slot track concentric with the lens holder, said calibration plate having a lower scale adjacent said slot calibrated to diaphragm stops, and a second scale above said slot calibrated in equal increments over a range proportionate to camera extensions, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another.

6. In apparatus for the purposes described, the combination with a camera having a lens board, a lens holder with lens and iris diaphragm with a diaphragm setting arm mounted thereon, of a calibration plate carried by said board and having a slot track concentric with the lens holder, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another.

7. In apparatus for the purposes described, the combination with a camera having a lens board, a lens holder with lens and iris diaphragm with a diaphragm setting arm mounted thereon, of a calibration plate carried by said board and having a slot track concentric with the lens holder, said calibration plate having a lower scale adjacent said slot calibrated to diaphragm stops, and a second scale above said slot calibrated in equal increments over a range proportionate to camera extensions, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another, and means to turn said dialing disc proportionately to the camera extension thereby to dial the diaphragm to the stops corresponding to different camera extensions.

8. In apparatus for the purposes described, the combination with a camera having a lens board, a lens holder with lens and iris diaphragm with a diaphragm setting arm mounted thereon, of a calibration plate carried by said board and having a slot track concentric with the lens holder, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another, and means to turn said dialing disc proportionately to the camera extension thereby to dial the diaphragm to the stops corresponding to different camera extensions.

9. In apparatus for the purposes described, the combination with a camera having a lens board, a lens holder with lens and iris diaphragm with a diaphragm setting arm mounted thereon, of a calibration plate carried by said board and having a slot track concentric with the lens holder, said calibration plate having a lower scale adjacent said slot calibrated to diaphragm stops, and a second scale above said slot calibrated in equal increments over a range proportionate to camera extensions, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another, and means by which said dialing disc may be turned.

10. In apparatus for the purposes described, the combination with a camera having a lens board, a lens holder with lens and iris diaphragm with a diaphragm setting arm mounted thereon, of a calibration plate carried by said board and having a slot track concentric with the lens holder, said calibration plate having a lower scale adjacent said slot calibrated to diaphragm stops, and a second scale above said slot calibrated in equal increments over a range proportionate to camera extensions, a dialing disc mounted on said board to turn on an axis eccentric to the said slot track, at least one push rod one end of which is pivoted to said dialing disc and the other end of which is guided in said slot track and carries a button, releasable means to connect said setting arm to said button whereby as said dialing disc is turned in one direction or the reverse said button will be advanced or retreated along said slot track, thereby turning the setting arm from one stop position to another, and means by which said dialing disc may be turned, said dialing disc having a pointer and a fixed scale graduated according to camera extensions by which said dialing disc may be set to dial the diaphragm stops correspondingly.

11. In apparatus for the purposes described, the combination with a camera having a lens board carrying a lens holder with lens and a diaphragm with a pivoted setting arm, of a fixed calibration plate having a slot track disposed concentrically with the axis of the lens holder, said arm projecting over and cooperating with said calibration plate, a set of buttons associated with said calibration plate, said buttons being equally spaced apart, a set of push rods having one end of each guided in said slot track and carrying said buttons, a dialing disc rotatably mounted to turn on an axis eccentric to the axis of said lens holder, said push rods having their other ends pivoted to said dialing disc at points equidistant from the center thereof, the push rods being of equal length, and means by which said dialing disc may be turned to set said buttons to positions corresponding to camera extensions for multiple stop exposures.

12. In apparatus for the purposes described the combination with a camera having a lens board carrying a lens holder with lens and a diaphragm with a pivoted setting arm, of a fixed calibration plate having a slot track disposed concentrically with the axis of the lens holder, said arm projecting over and cooperating with said calibration plate, a set of buttons associated with said calibration plate, said buttons being equally spaced apart, a set of push rods having one end of each guided in said slot track and carrying said buttons, a dialing disc rotatably mounted to turn on an axis eccentric to the axis of said lens holder, said push rods having their other ends pivoted to said dialing disc at points equidistant from the center thereof, the push rods being of equal length, means by which said dialing disc may be turned to set said buttons to positions corresponding to camera extensions for multiple stop exposures, and an additional button located between two of the others, an additional push rod for said additional button being also pivoted to said dialing disc with an adjustable pivot for single stop work.

13. In apparatus for the purposes described the combination with a camera having a lens board carrying a lens holder with lens and a diaphragm with a pivoted setting arm, of a fixed calibration plate having a slot track disposed concentrically with the axis of the lens holder, said arm projecting over and cooperating with said calibration plate, a set of buttons associated with said calibration plate, said buttons being equally spaced apart, a set of push rods having one end of each guided in said slot track and carrying said buttons, a dialing disc rotatably mounted to turn on an axis eccentric to the axis of said lens holder, said push rods having their other ends pivoted to said dialing disc at points equidistant from the center thereof, the push rods being of equal length, means by which said dialing disc may be turned to set said buttons to positions corresponding to camera extensions for multiple stop exposures, said last named means including a second disc rotatably mounted on an axis concentric with that of said lens holder, a connecting rod between said discs, and a power transmitting and translating mechanism operated by the extension and contraction movements of the camera for turning said second disc to effect the positioning of said buttons to accord with camera extension distances.

14. In apparatus of the character described, a camera having a lens board with a lens holder and a diaphragm with a pivoted operating arm, a calibration plate carried on said holder, a post on said board to support said plate against turning, said plate having a slot track concentric with the lens holder and a scale graduated to diaphragm stop intervals and a scale indicating camera extension distances cooperating with the diaphragm stop scale, a dialing disc pivotally mounted on said post and having a slot concentric with said post to pass said lens holder, a button cooperating with said plate, a push rod pivoted at one end to said dialing disc and having its other end passed through said slot and carrying said button, a gear-disc rotatably mounted on said lens holder and having a slot to pass said post, at least one connecting rod pivoted to said gear-disc and to said dialing disc, and a shaft and worm on said lens board for turning said gear-disc.

15. In apparatus of the character described a camera having a lens board with a lens holder and a diaphragm with a pivoted operating arm, a calibration plate carried on said holder, a post on said board to support said plate against turning, said plate having a slot track concentric with the lens holder, a dialing disc pivotally mounted on said post and having a slot concentric with said post to pass said lens holder, a button cooperating with said plate, a push rod pivoted at one end to said dialing disc and having its other end passed through said slot and carrying said button, a gear-disc rotatably mounted on said lens holder and having a slot to pass said post, at least one connecting rod pivoted to said gear-disc and to said dialing disc, and a shaft and worm on said lens board for turning said gear-disc.

16. In a camera, a back and a front connected by a bellows, the front having a lens holder with a lens and a diaphragm actuated by a swinging arm, in combination with means for dialing the diaphragm according to camera extension and for multiple exposures, said means including a driving disc, means to turn said disc through camera extension movement, a dialing disc, a connection between said dialing disc and said swinging arm, an intermediate disc concentric with said dialing disc, detachable means coupling said intermediate and dialing discs together, and an operating connection between said driving disc and said intermediate disc.

17. In a camera, a back and a front connected by a bellows, the front having a lens holder with a lens and a diaphragm actuated by a swinging arm, in combination with means for dialing the diaphragm according to camera extension and for multiple exposures, said means including a driving disc, means to turn said disc through camera extension movement, a dialing disc, a connection between said dialing disc and said swinging arm, an intermediate disc concentric with said dialing disc, detachable means coupling said intermediate and dialing discs together, an operating connection between said driving disc and said intermediate disc, and a time controlled mechanism, means cooperatively connecting said time controlled mechanism with said dialing disc for advancing said dialing disc from time to time, after said dialing disc shall have been uncoupled from said intermediate disc.

ELWIN D. LEHMAN.